United States Patent [19]

Pagano et al.

[11] 4,364,300
[45] Dec. 21, 1982

[54] COMPOSITE CORED COMBAT VEHICLE ARMOR

[75] Inventors: Victor H. Pagano, Rochester; John M. Hennessey, Warren, both of Mich.

[73] Assignee: The United States of America as represented by the Secretary of the Army, Washington, D.C.

[21] Appl. No.: 136,124

[22] Filed: Mar. 31, 1980

Related U.S. Application Data

[63] Continuation-in-part of Ser. No. 918,988, Jun. 26, 1978, abandoned.

[51] Int. Cl.³ .................................. F41H 5/04
[52] U.S. Cl. ........................... 89/36 A; 109/85; 428/911
[58] Field of Search ............. 89/36 R, 36 A; 109/80, 109/82, 84, 85; 114/12; 428/652, 653, 911, 608; 75/DIG. 1

[56] References Cited

U.S. PATENT DOCUMENTS

| | | | |
|---|---|---|---|
| 1,007,144 | 10/1911 | Schaumann | 114/12 |
| 2,438,759 | 3/1948 | Liebowitz | 89/36 A |
| 3,261,724 | 7/1966 | Ulam | 428/653 |
| 3,473,900 | 10/1969 | Sara | 428/608 |
| 3,516,898 | 6/1970 | Cook | 89/36 A |
| 3,699,842 | 10/1972 | Grewing et al. | 89/36 H |
| 3,969,563 | 7/1976 | Hollis | 89/36 A |
| 4,131,053 | 12/1978 | Ferguson | 89/36 A |

FOREIGN PATENT DOCUMENTS

365140 5/1919 Fed. Rep. of Germany ........ 114/12

Primary Examiner—Stephen C. Bentley
Attorney, Agent, or Firm—Peter A. Taucher; John E. Becker; Nathan Edelberg

[57] ABSTRACT

A light weight armor for combat vehicles, having at least three laminations of which at least the two outermost have the same mass, but with all having significantly differing densities and thicknesses. This composite armor comprises an outer layer of relatively thin quenched and high density, tempered high-hardness alloy steel to induce projectile shatter, and being the layer which is directly exposed to ballistic attack; a unique second lamination or core of a relatively low-density, high-strength nonferrous material and having at least the same mass as but much greater thickness than the first lamination; and an inner (the third) lamination of high-toughness, quenched and tempered alloy steel of medium hardness for spall resistance, being of lesser hardness than the first lamination, but substantially greater hardness than the second lamination; the "sandwich" is preferably sealed with a closure of edge pieces of low-carbon, low-alloy steel for easy fabrication of this three layer assembly, the most critical element for optimum performance being the second nonferrous much lower density lamination or core which is of at least the same or greater mass as the first lamination. Exemplary thicknesses for the respective plates from outside to the inside are ½", 1" and ¼".

1 Claim, 4 Drawing Figures

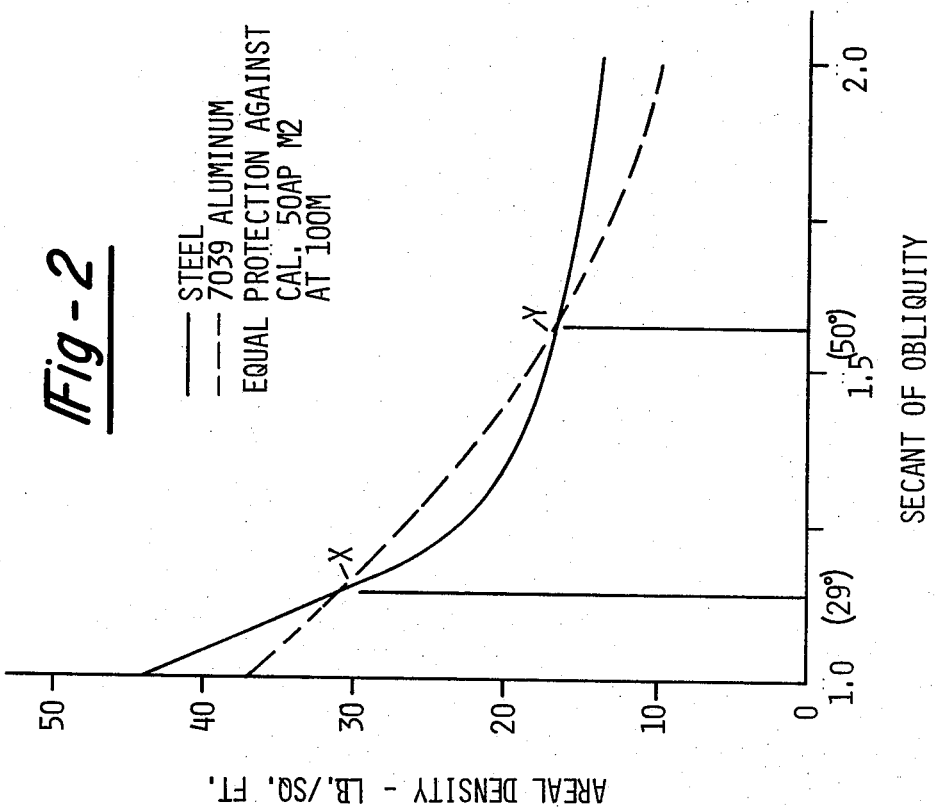
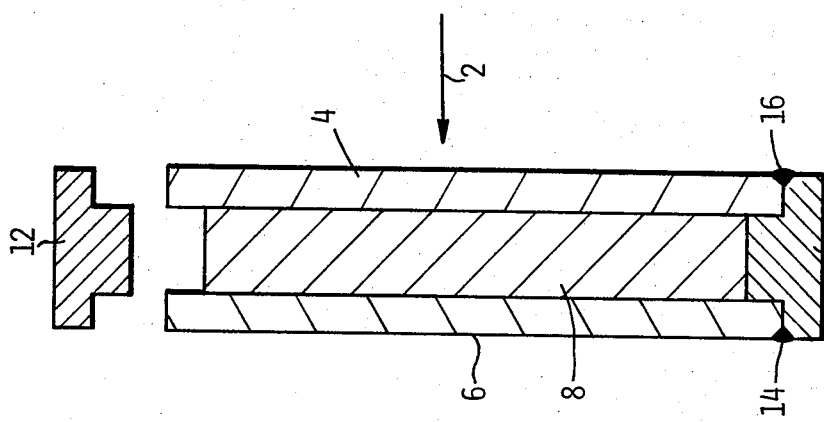

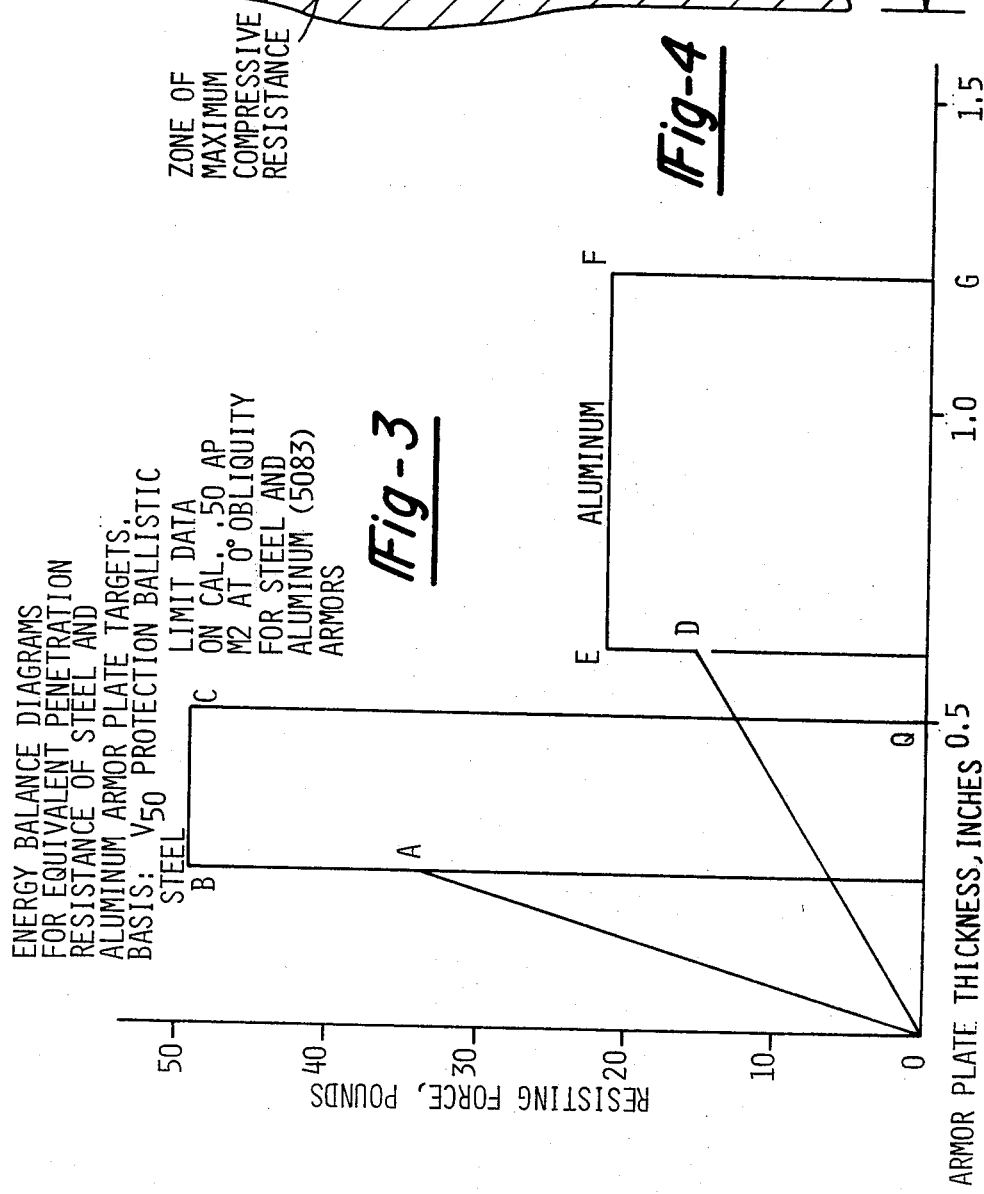

COMPOSITE CORED COMBAT VEHICLE ARMOR

GOVERNMENT INTEREST

The invention described herein may be manufactured, used, and licensed by or for the Government for governmental purposes without payment to us of any royalty thereon.

APPLICATION HISTORY

This application is a continuation in part of our application Ser. No. 918,988, filed June 26, 1978, now abandoned. We claim the filing date of June 26, 1978 for all common patentable subject matter.

BACKGROUND AND SUMMARY OF THE INVENTION

Traditionally, the search for better combat vehicle armor has emphasized stronger and tougher materials to resist more durable projectiles moving at higher velocities. Conventional approaches have led to progressively thicker armor, harder armor, and, inevitably, to heavier armor, and a corresponding sacrifice in vehicle mobility.

In extensive studies of armor, a surprising material feature was noticed which has given new impetus to materials armor design. Specifically, it involved the anomalous differences in ballistic behavior between aluminum armor and steel armor at low and high obliquities. People with a great deal of armor experience began to ask: why does a material having one-third the strength of armor steel sometimes show better results against projectiles than steel does?

Assuming no change in projectile form, the most apparent answer points to the thickness or path presented by the armor to the projectile. The greater the length of this path the greater the work resistance or consumption of projectile energy. The lower the density of the material, the greater the "work path" for a given weight of armor. If this feature were combined with high strength, even greater ballistic capability could be provided in a chosen material configuration. The effectiveness of this lower density core is further improved if the shape or form of the projectile is altered. This is accomplished by the hard steel front plate which can crack or fracture the projectile.

The medium strength steel back plate adds shock toughness to the total material system and facilitates easy fabrication since a weldable steel is present on both faces of the armor package. Thus, the invention presents an armor concept which attempts to accentuate the ballistic advantage of increased penetration resistance available in a low density-high strength material through a composite material arrangement.

SUMMARY OF THE INVENTION

The invention is a cored composite armor which in one assembly combines the advantages of a high hardness alloy steel armor and the absorptive capability of a low-density (hence, light weight), high strength core, the two being backed up by an alloy steel high-toughness back plate. To provide an integral composite assembly for design application, the edges of the front and back plates are connected by low-carbon, high tensile steel edge pieces welded to the two plates of high hardness and high toughness steel, thus sealing the edges of the "sandwich".

It is accordingly an object of the invention to combine the characteristics (physical properties) of a plurality of differing materials in order to offset the weaknesses of some by the strengths of others, so that the resulting combination provides a composite resistance to attack which is light weight, and is unattainable through the use of any one, homogeneous, known, armor plate.

IN THE DRAWINGS

FIG. 1 is a cross section through a piece of armor embodying the invention, the edge piece at the upper end of the drawing being shown slightly separated from the rest of the pieces and ready for assembly therewith by welding.

FIG. 2 is a performance curve showing typical ballistics results as a function of attack angle (obliquity) for various weights or thicknesses of steel and aluminum armor against a caliber .50 armor piercing (AP) projectile fired from 100 meters.

FIG. 3 is a graph showing energy balance diagrams for equivalent penetration resistance of steel and aluminum armor plate targets; and FIG. 4 is a cross section through a piece of armor plate of thickness T at the plane of penetration of a projectile of diameter D in which $T/D \geq 1$, and shows the typical behavior of armor plate under ballistic attack.

DETAILED DESCRIPTION

The cored armor shown in FIG. 1 represents a form of armor which might be used on armored vehicles, wherein arrow 2 is outside the vehicle and represents attacking projectiles. In the assumed circumstances, the armor layer (or face plate) 4 is on the outside of the vehicle and, as the outer layer, is the lamination that is directly exposed to ballistic attack.

(The laminations as here shown primarily illustrate that our invention does not consist of one homogeneous thickness, rather than suggesting the thickness of any given layer or lamination relative to the others.)

In our application, we propose that face plate 4 be a quenched and tempered hard-face material chosen in terms of both hardness and critical thickness necessary to shatter the attacking projectile, such as a half inch thick alloy steel having a 500-600 BHN number, which would suffice to shatter a 20 mm AP round.

Back plate 6 is on the side opposite the primary vehicle structure and thus is not usually thought of as being directly exposed to ballistic attack. Back plate 6 should be a quenched and tempered steel having maximum toughness or ductility with high strength, and we propose a quarter inch thick alloy steel plate of a 300 BHN number.

The primary element (meat of the sandwich) is the core or lamination 8 disposed between face plate 4 and back plate 6, and it should have a low density and high strength, and of about one inch thickness. We propose a density range of approximately one-sixth to two-thirds of the density of iron, these being roughly the densities of graphite fiber reinforced aluminum, and titanium, respectively.

The edges of the sandwich are closed by T-shaped elements 10 and 12 which are weldably compatible with plates 4 and 6 at adjacent edges, as shown at 14 and 16 for element 10. Element 12 is shown before assembly to better illustrate the structure. We do not presently contemplate bonding the contacting surfaces, i.e., plate 4 to plate 8, and plate 6 to plate 8. Elements 10 and 12, when welded to plates 4 and 6, hold the sandwich together for ease in handling. For example, elements 10 and 12 can be a very low (0.10) carbon, low-alloy steel extruded in the shape shown, having a minimum tensile strength of 70,000 psi. The steels of plates 4 and 6 readily permit welding to the proposed steel material for elements 10 and 12.

DESCRIPTION OF FIG. 2

We consider now the ballistic anomalies of aluminum armor as opposed to steel armor, and the "core" concept.

In FIG. 2, the horizontal axis is the "secant of obliquity." The angle referred to is the angle by which the attacking projectile deviates from normal to the surface of the armor under attack. For example, arrow 2 in FIG. 1 represents a projectile attack normal to surface 4, so the angle of obliquity is zero, for which the secant is unity.

The vertical axis in FIG. 2 plots "areal density" in terms of pounds of armor per square foot of exposed area. Two curves are shown, plotting areal density against secant of obliquity, for steel (solid line) and for aluminum (dotted line). The two curves compare the areal density for the two metals for equal protection against a caliber .50 AP M2 round at any given angle of attack.

For example, if the projectile has an approach angle normal to the face, so that the secant of obliquity is unity, aluminum will provide the same resistance to penetration as steel for less areal density, i.e., about 37 lbs. per square foot for aluminum as opposed to about 44 lbs. per square foot for steel. Aluminum has an advantage until the angle of obliquity reaches approximately 29°, at which point, X, the curves intersect at about 31 lbs. per square foot.

Steel then has the advantage until the curves intersect again at point Y, about 50° from normal and about 17 lbs. per square foot areal density.

It is reasonably certain that several factors account for this change in relative effectiveness; first, the relative thickness effect (due to the path of projectile travel) afforded by the armor materials for the same weight; and second, projectile interaction with each armor material as a function of obliquity.

In FIG. 2, the areal density varies as the ordinate of the graph, but in a given vehicle, the areal density is determined by the vehicle design specifications and remains fixed as constructed. Obviously, at a selected location, the areal density is fixed and invariable, even though conceivably it could be different a few inches away.

At a given location on the vehicle, the areal density can be determined. Assuming the dimensions given above of a half inch for plate 4 and one inch for core 8; assuming a zero angle of obliquity; and using the specific gravity of the element table for iron and aluminum, FIG. 2 shows immediately that the same protection can be obtained for much less weight with (for example) aluminum.

What happens is that equal weights of aluminum and steel provide much greater thickness of aluminum and thus force the projectile to penetrate greater bulk, increasing the length of travel the projectile must go through to penetrate the armor plate. The increase in the travel path requires the projectile to do much more work in its effort to push through the greater bulk of material, and thus contributes greatly to reducing projectile energy or velocity.

The foregoing paragraph refers to equal weights of metals of different areal densities to force the projectile to do much more work in its path of travel through the layer of less dense metal. FIG. 2 is based not on equal weights but equal protection, and shows that equal protection is offered by the less dense metal for a substantially lighter weight throughout all but approximately 21° of the 90° quadrant.

We have found, therefore, that the "meat of the sandwich" is the key to more effective armor plate. The outer lamination 4, which is directly exposed to ballistic attack, is a substantially conventional high-alloy, high-hardness armor steel plate which confronts the projectile with high reflective shock tensile forces in a relatively short travel path, and thus severely stresses the projectile, so much so that the structural integrity of the projectile is impaired by the formation of cracks. When the projectile reaches the low-density core 8, the long path of travel through the core brings about more complete breakup of the cracked projectile and substantially reduces its velocity because of the effort by the projectile to displace the great bulk of the low-density metal. Thereafter, if the projectile or its pieces can penetrate the entire thickness of core 8, the velocity thereof is so greatly reduced that the inner plate 6 cannot be penetrated.

The key to the invention is the length of the path which the projectile must take through the metal which must prevent penetration of the armor plate by the projectile. The armor plate accomplishes its objective by a combination of high and low-density metals, wherein the first plate confronts the projectile with a high-hardness, high-density but relatively short travel path to weaken projectile structural integrity, and the core 8 confronts the projectile with a low-density but greater bulk, and relatively longer travel path to slow down the projectile (or its pieces) to an energy level that can be contained by the inner plate 6.

DESCRIPTION OF FIG. 3

As aforesaid, we here show energy balance diagrams for equivalent penetration resistance of steel and aluminum armor plate targets. The basis for the diagrams is the $V_{50}$ protection ballistic limit data on caliber .50 AP M2 ammunition at 0° obliquity for RHA steel and for aluminum (5083) armors.

Static conditions are assumed, which discounts the material strengthening effect related to dynamic loading rates associated with ballistic projectile penetration. The striking kinetic energy of a projectile fired from 100 meters is $KE_{V50} = \frac{1}{2} MV^2$ wherein the velocity V is 1800 feet per second and the projectile mass M is equal to w/g; where w is one tenth of a pound, and g (the gravitational constant) is 32.2 ft/sec$^2$. The result is a numerical answer of $60.4 \times 10^3$ in-lb, or 60,400 inch pounds.

A tabulation of the static data breaks down as follows:

| MATERIAL | ALUMINUM | STEEL |
| --- | --- | --- |
| Thickness | 1.2 inch | 0.5 inch |
| Yield Strength | 50,000 psi | 138,000 psi |
| Ultimate Strength | 60,000 psi | 160,000 psi |

| -continued | | |
|---|---|---|
| MATERIAL | ALUMINUM | STEEL |
| Work | 17,700 in-lb | 17,300 in-lb |

In the foregoing table, the "work" is the area under the curve in each case. For steel, the boundaries of the work area are O-A-B-C-Q-O. For aluminum, the boundaries are O-D-E-F-G-O.

The tabulated work figures, 17,700 in-lb for aluminum and 17,300 in-lb for steel, are at variance with the figure provided by the kinetic energy equation above, namely 60,400 inch-pounds, by a factor of approximately 3.5; the explanation is largely the above-described phenomena of dynamic material behavior, i.e., higher apparent strength during ballistic penetration.

The effect of armor thickness is quite evident from a detailed study of FIG. 3, wherein the horizontal lines B-C and E-F mark the break-through penetration depth. Initial penetration resistance in the aluminum (i.e., along line O-D) is provided by shear deformation on the one hand, and by material flow at a material strength value somewhere between shear yield and tensile yield. At D, the resistance increases very sharply due mostly to compressive yielding of the armor at strength values somewhere between yield and ultimate.

The penetration resistance in steel follows a similar pattern, the one major difference being material thickness. Even though steel has a significantly higher strength, the greater displacement distance of aluminum offsets that advantage.

Another consideration is the governing material property or primary strength during projectile penetration. The thicker the plate, the greater the influence of material compressive yield strength on the material flow process and thus the greater the penetration resistance, which fact gives the designer of armor plate some leeway in the choice of material, taking into account the resistance force or strength value of the material of which the armor is made.

Another factor is the anomaly illustrated in FIG. 2, discussed above, namely the influence of the projectile attack angle, combined with strength or hardness of the armor material, to provide increased penetration resistance by introducing breaking up or shattering of the projectile. The softer aluminum does not induce a sufficient shock stress level to shatter the projectile, and thus requires more thickness or weight to resist the higher kinetic energy of an intact projectile. At greater angles of obliquity, from point Y and to the right thereof, aluminum, even though softer than steel, recovers its advantage by imposing on the projectile a sufficient thickness to impose projectile fracture forces and scooping, while steel under these conditions is more vulnerable to low energy punching.

DESCRIPTION OF FIG. 4

FIG. 4 is a diagram showing typical behavior of armor plate under ballistic attack in circumstances wherein armor plate thickness is at least as great as projectile diameter, expressed as:

$$T/D \geq 1$$

where T is armor thickness and D is projectile diameter.

Attention is invited in FIG. 4 to the caption "ZONE OF MAXIMUM COMPRESSIVE RESISTANCE" and the lead line pointing to the material zone surrounding the projectile just behind the ogive.

A projectile attempting to work its way through a thickness of armor plate must displace the material immediately in front of its path. At impact, such displacement is relatively easy because the nose of the projectile needs but to push some of the material radially outward. Such displacement results in formation of a substantially circular ridge as seen at R in FIG. 4.

A thin "plate" is quite easily penetrated, because of a punching or shearing action. A somewhat thicker plate is penetrated by a combination of tensile bending and shear tearing action.

For a thicker armor such as contemplated here, where $T \geq D$, the material zone described above enters into the material failure process. In this zone there is no place for the armor metal to go to as the projectile tries to advance through the armor.

As a result, the armor metal undergoes projectile loads that are primarily compressive in nature. The high compressive strength of the armor dramatically increases the plate's resistance to penetration from imposed projectile kinetic energy loads. By maximizing this compressive resistance feature in the "core" material element through lower density and higher strength materials design, the composite armor system proposed herein can yield new weight saving ballistic capability for more efficient vehicle design.

We wish it to be understood that we do not desire to be limited to the exact details of construction shown and described for obvious modifications will occur to a person skilled in the art.

We claim:

1. A composite cored armor plate for military combat vehicles to resist penetration by high velocity armor piercing projectiles, said armor comprising:
   (a) a composite of a first, second and third laminations of different densities, of which at least the first and second laminations are of at least equal masses, said first lamination having a surface directly exposed to potential armor piercing projectile attack;
   (b) said first lamination consisting of a relatively thin quenched and tempered alloy steel plate having a relatively high density and BHN hardness to confront said armor piercing projectile with a high density bulk for a relatively short travel path so as to induce projectile cracking and impair projectile integrity; the BHN hardness being in the 500-600 range;
   (c) the second lamination being immediately adjacent said first lamination, and being of a relatively low density high strength nonferrous metallic material; its density being of from one-sixth to two-thirds that of the first lamination;
   (d) said second lamination being selected from the group including graphite-fiber-reinforced aluminum material and a titanium material, and while having at least the same mass as said first lamination has a much greater thickness than the first lamination, thereby forcing the projectile to do more work to traverse and to potentially penetrate its much greater bulk while simultaneously reducing projectile energy;
   (e) the third lamination being spaced apart from said first lamination but immediately adjacent the second lamination; said third lamination having lesser BHN hardness than the first lamination and substantially greater hardness than the second lamination; and
   (f) said third lamination consisting of a relatively thin, high toughness, quenched and tempered alloy steel plate having a BHN hardness of approximately 300 so as to substantially arrest such velocity as the projectile and fragments might still possess.

* * * * *